May 1, 1934.  J. TATE ET AL  1,956,912

SCROLL SAW AND BAND SAW

Filed May 8, 1933  2 Sheets-Sheet 1

Inventors
JAMES TATE,
HERBERT E. TAUTZ,

By Carl A. Hellmann,
Attorney

May 1, 1934.  J. TATE ET AL  1,956,912
SCROLL SAW AND BAND SAW
Filed May 8, 1933   2 Sheets-Sheet 2
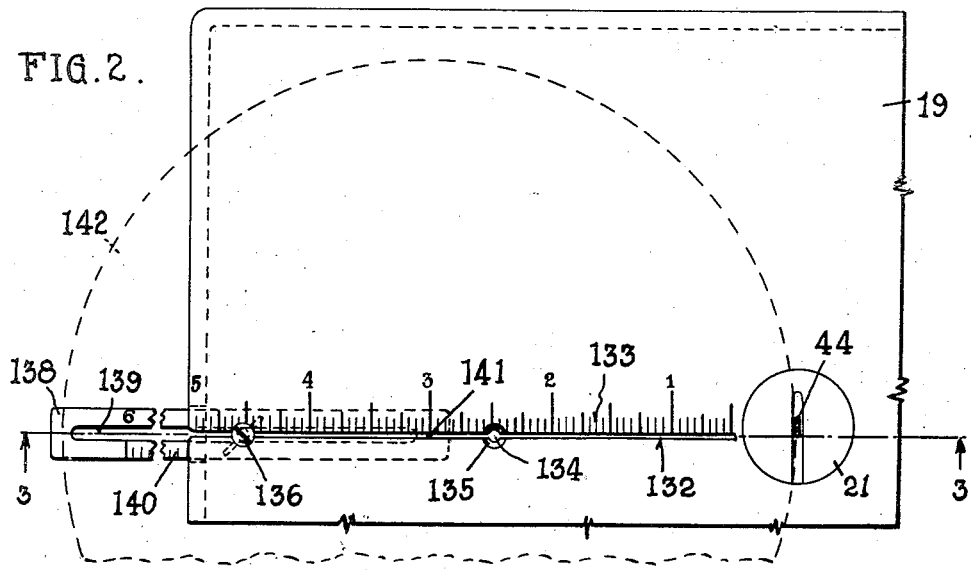
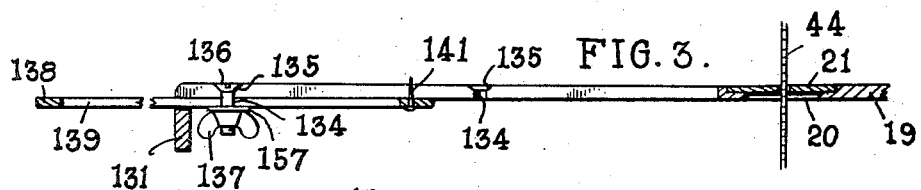
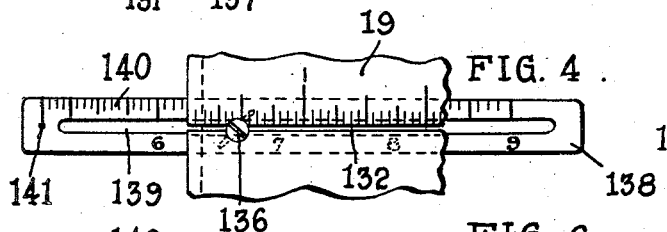
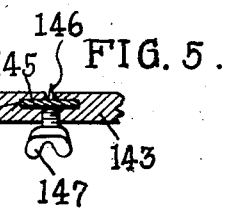
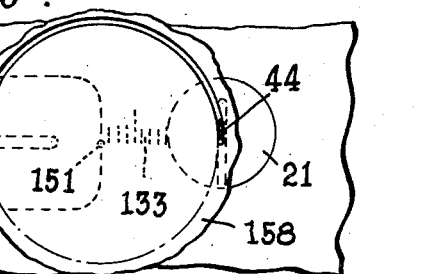

Patented May 1, 1934

1,956,912

UNITED STATES PATENT OFFICE 1,956,912

SCROLL SAW AND BAND SAW

James Tate and Herbert E. Tautz, Milwaukee, Wis., assignors to Delta Manufacturing Company, Milwaukee, Wis.

Application May 8, 1933, Serial No. 670,002

12 Claims. (Cl. 143—171)

This invention relates to scroll saws and band saws.

More specifically it relates to improvements in the structure of the table of a scroll saw and attachments for the same, particularly a saw of the type shown, for example, in the prior patent of Herbert E. Tautz, one of the present joint inventors, No. 1,877,705.

An object of the invention is to provide means for feeding workpieces to the saw blade in such manner as to facilitate the cutting of circular pieces.

More specifically this object is attained by providing an adjustable pivot for a workpiece and means for rigidly securing the said pivot to the saw table, to serve as a center about which a workpiece is turned during the sawing operation.

This object is attained by providing a slide carrying a pivot, said slide being adjustable with respect to the saw table and means for adjustably securing the said slide to the said table.

A further object is to provide a pivot carried by a slide which may be reversed, if desired, to increase the range of sizes of discs or other circular pieces which may be cut.

A further object is to provide an attachment which may be removably secured to an existing saw table for either a scroll saw or a band saw and which carries a preferably resilient flexible thin member carrying a pivot for a workpiece, and means on the attachment for adjustably securing the said member and its pivot at a desired point with respect to the blade of the saw.

Other objects and advantages of the invention will be evident from the various features set forth in the present specification and defined in the claims appended thereto.

For a clear understanding of the invention, reference is to be had to the accompanying drawings, illustrative of several embodiments thereof.

Figure 1:
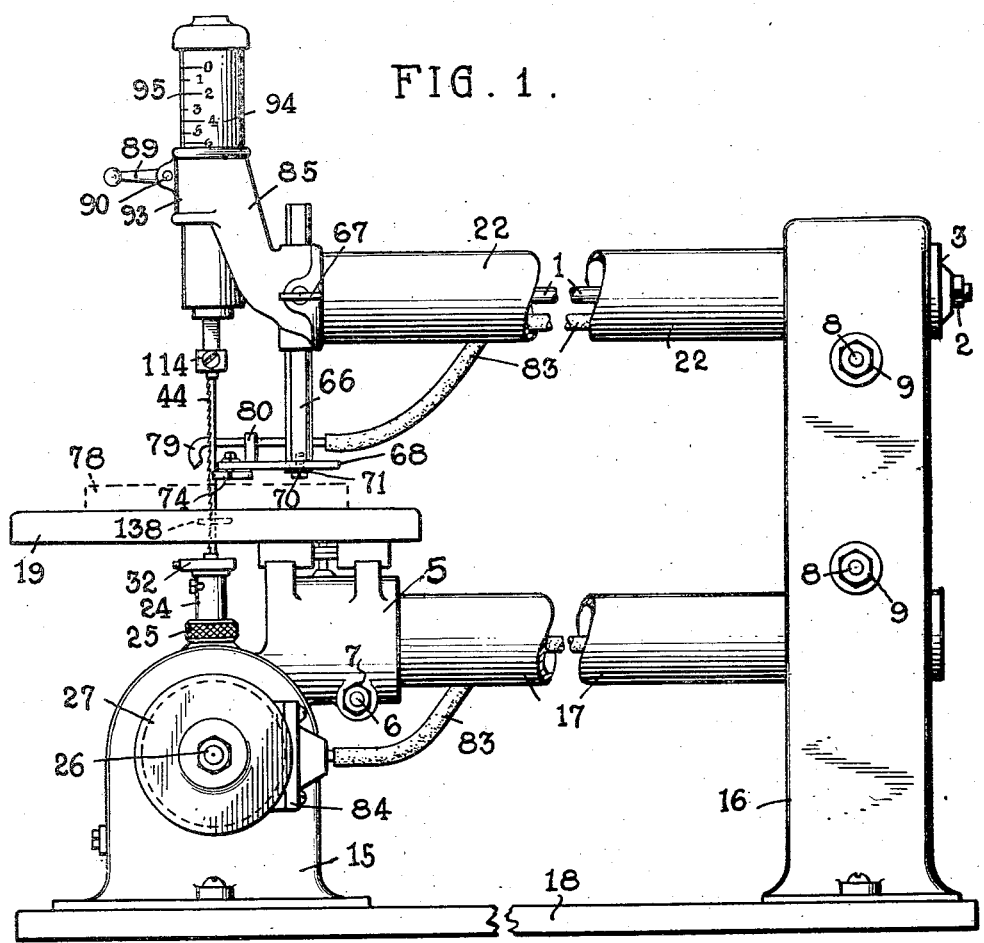
Figure 8:
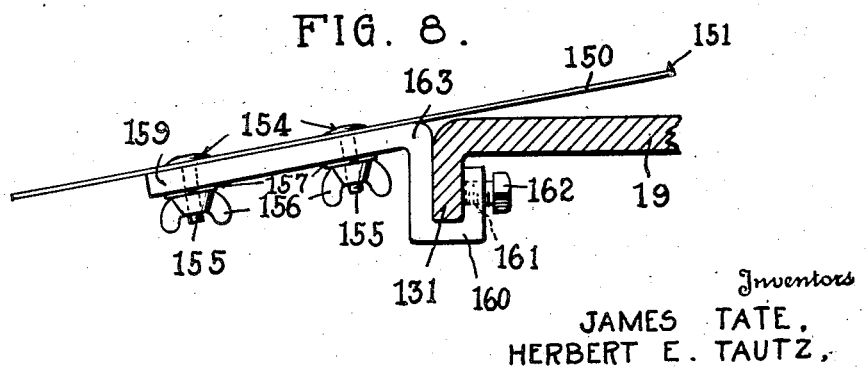

In said drawings:

Fig. 1 is a side elevation of a scroll saw embodying the invention, portions being broken away, to permit illustrating the remaining details on a larger scale, Fig. 2 is a top plan view showing a portion of the table, on a much larger scale, the saw blade being indicated in section and certain parts being broken away, Fig. 3 is a vertical detail section on the plane indicated by the line 3—3 of Fig. 2, looking in the direction of the arrows, Fig. 4 is a fragmentary detail plan view of a portion of Fig. 2, with the slide reversed, Fig. 5 is a fragmentary cross section showing how the invention may be applied to a different kind of table, Fig. 6 is a fragmentary detail plan view of a still further modification of the device shown in Fig. 2, Fig. 7 is a corresponding front elevation thereof, and Fig. 8 is a diagrammatic front elevation of a still further modified form of the invention, namely, an attachment which may be removably secured to a saw table, a portion of said saw table being shown in cross section, to illustrate one manner of securing the attachment to the flange of the table.

In the various figures similar parts are designated by the same reference characters.

Referring first to Fig. 1, there is illustrated a scroll saw embodying certain features of the invention, together with features of the older form of scroll saw, in order to show how the invention is to be used. In this figure, 15 designates a main drive housing which is fixedly secured to a rear support or standard 16 by means of the tubular arm 17, the housing 15 and the support 16 being preferably mountable upon a suitable base, such as 18.

A work table 19 is secured to the drive housing 15 and is mounted to tilt thereon about an axis lying preferably in the supper surface of the table and in line with the saw blade. The work table is provided with a suitable opening for the passage of the saw blade, and with means for securing the said table in any desired adjusted position about its axis.

The housing or crank case 15 contains suitable operating mechanism for reciprocating the lower plunger 24 which is mounted slidably in the bushing 25 secured to the housing. The power for operating the said plunger is transmitted thereto through the crank shaft 26 by means of the pulley 27 which may be rotated by any suitable motor or other source of power. A suitable chuck designated generally as 32 cooperates with the plunger 24 to hold the lower end of a saw blade 44 in order to reciprocate said saw blade through the table.

An air pump 84 is also secured to the housing 15 and actuated by said shaft 26 to provide an air blast which passes through the flexible tube 83 into the tubular arm 17, said tube passing thence upward through the standard 16 and into the upper tubular arm 22, and finally terminating in a nozzle tube 79 adjustably secured in a support 80, to blow away the sawdust from the upper surface of the workpiece 78 resting upon the table 19.

The lower tubular member 17 may be secured to the housing 15 in any desired way, for example by being mounted in a suitable lug 5 secured to the housing 15 and split longitudinally at its lower part, in cooperation with a bolt 6 and nut 7 which will clamp the split lug 5 closely against the member 17. The tubular members 17 and 22 are secured to the rear standard 16 in any desired manner, preferably by providing suitable bores extending through the said standard, the portion of the standard between said bores being slit, and drawn together by means of the bolts 8 and nuts 9 in the manner customary and well known in machine construction.

A preferably polygonal rod 66, in the present case shown as hexagonal in cross section, has a bar 68 adjustably secured to its lower end, for example, by means of a bolt 70, a washer 71 being interposed between the bar and the head of the bolt. The support 80 for the nozzle 79 is also secured to this bar 68 in any desired manner and said bar 68 likewise supports adjustably the rotatable head 74 which has a series of slots at its periphery adapted to receive saw blades 44 of varying thicknesses and widths. All the features so far described are old and are already disclosed in the prior patent, above mentioned, and are described herein merely to illustrate how the improved features cooperate with the old structure.

Referring now to the head designated by reference character 85, in Fig. 1, it will be noted that this head takes the place of the head 23 disclosed in the prior Patent No. 1,877,705 and is secured rigidly in position and in alinement by means of a rod 1 secured thereto, said rod extending through the tubular member 22 and being rigidly secured to the other end of said member and to the standard 16 by means of a washer 3 and a nut 2. The rod 66, already mentioned, passes through a suitably formed guideway in the head 85 and is secured at any desired elevation by means of the thumb screw or the like 67, shown in Fig. 1. It will be noted that the head 85 differs from the head 23 of the prior patent in that instead of extending in a generally horizontal direction as a continuation of the tube 22 it extends upward above said tube, as clearly shown in Fig. 1. It differs also from the former construction in that it is preferably split in front, and a bolt 90, having an operating lever 89 secured thereto, is threaded into one portion of said split part, while it passes freely through the other part so that the two parts may be drawn together or again released by proper manipulation of the arm 89. The tubular housing 94 contains a spring or other means for returning the plunger of the saw on its up stroke and a scale 95 for indicating the tension of the said spring. These features are disclosed and claimed in the co-pending application of Herbert E. Tautz, filed May 5, 1933, Serial No. 669,587, for Scroll saws, form no part of the present invention, and are mentioned herein only to complete the disclosure.

Referring now to Figs. 2, 3 and 4 there is disclosed a portion of a table 19, namely, the same table as is shown as a whole in Fig. 1, and having a removable, substantially circular, radially-slotted insert disc, retained within a circular rabbeted opening 20. Through the slot of this disc 21 passes the saw blade 44. A slot 132 is provided passing completely through the top of the table 19 and extending preferably to the extreme left hand edge of the same. The depth of cut in making this slot, however, is preferably such as to leave practically all of the flange 131 uncut (except for a horizontal slot to allow the passage of the slide 138, shown dotted in Fig. 1) so that the table remains practically as rigid as before and sufficiently stiff for all normal cutting operations undertaken thereon. Any desired number of holes 134, having their centers alined with the central plane of the slot 132 may be cut at any desired locations, each such hole having preferably a flared or countersunk portion 135 adapted to receive the head of a screw 136 which may be inserted through any desired one of the holes 134 and when so inserted will have its head either flush with the top plane of the table or somewhat below the same, so that it will not interfere with a workpiece, such as 142, placed upon the table.

A slide member 138, slotted at 139, the slot being of such width as to pass freely over the shank of the screw 136, is arranged beneath the top of the table and may be secured at any desired position, within the possible limits, by means of the screw 136 and a cooperating wing nut 137 and washer 157. Near one end the slide member carries a projecting pointed element 141, which may be secured to the member 138 in any desired way as by welding, soldering, riveting or threading, or may even be formed integral therewith. The length of the element 141, as best shown in Fig. 3, is sufficient to allow it to project slightly above the plane of the top of the table 19 when the top surface of the element 138 is flush with the corresponding bottom surface of the table.

A scale, preferably of inches and fractional parts thereof, may be provided on the top of the table 19 adjacent one edge of the slot 132 and it will be noted that these graduations are provided with numbers designating the distance between the left hand edge of the saw blade 44 and the graduation in question. These graduations are intended to indicate the distance of the pivot pin 141 from the nearest side of the saw blade 44 when the said element 141 projects through the slot 132. The purpose of providing a plurality of holes 134 in place of a single one is to make it possible to clamp the slide 138 to the table as closely as possible to the pin 141 to prevent undesirable downward yielding of said pin when a force is applied against the top thereof.

The slide 138 is shown in one relation to the table in Figs. 2 and 3, and in a reversed position with respect to said table in Fig. 4, that is, in order to bring the slide 138 into the position shown in Fig. 4 the said slide is pulled out completely from engagement with the table and re-inserted after turning it end for end. This will bring the pin 141 to the left end of the member 138, instead of to the right end as in Figs. 2 and 3. In order to cooperate with this position of the slide, a scale 140 may be provided on the said slide itself, the numerals designating the graduations thereon being arranged properly to indicate the distance between the pin 141 and the left side of the saw blade 44.

The form of table disclosed in Figs. 2, 3 and 4 is made by stamping from a flat stock of metal, ordinarily known as sheet metal, and is the preferred form of table. However, as shown in Fig. 5, the invention is applicable also to a table made of a solid cast material which will ordinarily be of greater thickness than the stamped table. This cast material is indicated in Fig. 5 at 143 and 150 it may be provided with a slot 144 of inverted T-shape, as shown, to accommodate a slide 145 having a pin or pivot point 146 secured thereon. Any desired number of screws 147 may be threaded into the material of the table top as shown in Fig. 5, and provided with wings for ease of manipulation, although a single screw 147 will ordinarily be sufficient, if placed near the outer or left hand edge of the table, because the material of the table top itself at the bottom of the slot 144 will provide sufficient support for the slide 145, whereas such support is not available in the stamped metal form.

In other respects the Fig. 5 form may be exactly like that of Figs. 2, 3 and 4 and the same scales, slots, etc., may be provided.

Referring now to Figs. 6 and 7, there is illustrated a still further modification of the device. In this form there is no slot cut in the table top, but said table top, 148, is provided with an extension 149 bent at a small angle to the main table. Upon the table there rests a flat piece of rather thin flexible material 150, preferably sheet steel, sheet brass, or the like, and having a slot 152 extending practically throughout the length thereof. This flat member 150 carries, preferably at or near its right hand or inner end, an upwardly extending pin or pivot point 151, which corresponds to the points 141 and 146 of the precedingly described forms of the device. The slot 152 accommodates a headed pin 153 which prevents the element 150 from shifting laterally, but does not prevent free longitudinal sliding thereof, and the said slot also accommodates a screw 155 having a flat head 154 and which may be secured to the extension 149 by means of a wing nut 156, a washer 157 being interposed if desired. The table top 148 will, of course, also preferably be provided with a scale 133 identical with that of Fig. 2.

Referring now to the form shown in Fig. 8, this figure represents an attachment comprising a metallic member 159 which may be attached to the flange 131 of a table 19. In order to attach this member 159 to the said flange it is bent at 163 to an acute angle slightly less than a right angle and below the bend 163 it is provided with a portion bent into a U shape as shown at 160, the space between the arms of the U being sufficiently large to freely admit the flange 131 of the table top 19. This U-shaped member has a threaded aperture 161 in one of its arms through which passes a set screw 162 which may be tightened against the flange 131 to secure the attachment 159 properly in position. The depth of the U-shaped portion of this member is made just sufficient to bring the top of the bend 163 into proper position just below the top surface of the table top 19.

Bolts 155, provided with relatively flat heads 154, pass through suitable openings in the attachment 159 and are secured beneath the said attachment by means of wing nuts 156, suitable washers 157 being interposed, if desired. It will be noted that the parts 154, 155, 156 and 157 are identical with the corresponding elements shown in Figs. 6 and 7, but two bolts 155 are provided in the Figure 8 form in place of the single bolt 155 and the projection 153 used in Figs. 6 and 7. The flexible slotted member 150 carrying the pin or projection 151 at or near its end is clamped beneath the heads 154 of the two bolts 155 and functions in other respects precisely as it does in the Figs. 6 and 7 form. It will be noted that the Fig. 8 form is substantially the same as the Figs. 6 and 7 form, except that it is a removable attachment whereas the latter is a "built-in" equivalent thereof.

While the operation of the device is believed to be obvious from the above description of the structure, nevertheless it may be desirable to describe such operation in detail to avoid any possible lack of clearness.

Referring to the operation of the structure illustrated in Figs. 2–8 inclusive, it will be clear that, if a workpiece, such for example as 142, is placed upon the table 19 with the pivot 141 arranged at the three inch mark, as shown in Figs. 2 and 3, a suitable starting point having been provided adjacent the saw blade 44, if the said workpiece be then rotated about this pivot, the workpiece will be cut into a circular shape by the saw blade 44, the diameter of the resulting circle being six inches, or in other words, the radius of the circle being three inches, the distance between the saw blade and the pivot 141. The pivot 141 is sufficiently sharp and strong to retain the center of the piece of wood or other material at a proper fixed position with respect to the saw blade so that the only remaining motion possible to the said workpiece is one of rotation about the said pivot, thus resulting in the production of a circular disc by the saw.

Obviously, the radius of such disc may be varied as desired by suitably shifting the slide 138 carrying the pivot 141, until the said pivot is opposite the graduation indicating the necessary radius. In the position of the slide 138 shown in Fig. 2, it is obvious that circles of a radius up to approximately 4⅜″ can be cut, but by reversing the slide 138, end for end, into the position shown in Fig. 4, a further range of sizes is made possible and with the slide in this position other circular discs may be cut beginning where the Fig. 2 form leaves off and extending outward to any desired extent within the limits of the slide. Of course, various slides 138 of differing lengths may be provided, the only limit to the extension beyond the left hand edge of the table being imposed by lack of rigidity when too great an extension is attempted. If the slide 138 is chosen sufficiently short so that its inner end will not strike the saw blade when the pivot 141 is at the 4⅜″ mark, then it is obvious that with a slide of such length discs of any desired diameter between 1″ and, say, 18″ can be cut with the help of a single slide.

When using the Fig. 5 form where there is no slot in the slide and no screw passing through the slide itself, but instead a single screw 147 engaging the face of the slide from below is sufficient to hold the slide securely, it is likewise obvious that circular discs of any desired diameters can be cut, and in this case without requiring any shifting of the screw 147 from one hole to another, as in the Fig. 2 form. It is likewise obvious that in either of these forms the slide carrying the pin or pivot can be readily removed from the saw table when not required, thus leaving the table unobstructed. It is likewise possible to invert the slide in either one of these forms and thus clamp it securely to the table so as to prevent its loss when not in use, but nevertheless have its pin or pivot pointing downwardly, out of the way and not interfering with a workpiece on the table.

Passing now to the operation of the structure illustrated in Figs. 6 and 7, the operation thereof is very simple. The pivot 151, secured or provided in any desired way at or near the end of the flexible member 150, can be adjusted to any desired distance from the saw blade 44 by means of the scale 133 and can then be clamped in its adjusted position by means of the screw 155 and nut 156. The purpose of the member 153 is to retain the slot 152 approximately in line between the screw 155 and the saw blade 44, and said member 153 may be omitted if any other way is provided for clamping the member 150 securely to the table. In some cases the screw 155 alone may be considered sufficient for this purpose, but usually it will be preferable to provide the additional security furnished by the member 153.

It will be noted that the head of the member 153, which extends beyond each edge of the slot 152 in a direction at right angles to said slot, is nevertheless narrower than the said slot in its other dimension so that whenever it is desired to remove the member 150 it is necessary merely to remove the screw 155 and then to turn the member 150 through a right angle about element 153 whereupon it can be lifted bodily off from the same. It will be noted also that both 153 and 154 lie below the plane of the top of the table so that neither of these elements will interfere in any way with a flat workpiece lying upon the said table.

By reason of the extreme thinness of the slide 150 it will add substantially nothing to the thickness of the table top and will thus not interfere seriously with a workpiece lying flat against the table top, but yet by reason of the rather great lateral width of the said member 150 it will be very stiff in the direction of the plane of the table top so that the pivot 151 can not shift forward or back on the said table to any appreciable extent during the operation of cutting a disc.

It will be obvious that the operation of the modification shown in Fig. 8 is substantially the same as that of the form just described and illustrated in Figs. 6 and 7. The difference between Fig. 8 and the said preceding form resides chiefly in the fact that this form is an attachment which may be caused to cooperate with the table of any suitable saw, already available, and does not require a specially formed table as does the preceding form. This is advantageous in certain cases because it enables the owner of an existing saw to provide the disc cutting feature thereon even though such feature was not originally contemplated in the saw table. It will be noted that this attachment, which comprises the bracket 159 and the attaching means, in the present case a U-shaped prolongation of the bracket and a set screw 162 cooperating therewith, makes it possible to clamp this device securely, but removably, to the flange 131 of the table 19. Obviously, with other types of tables not having such flange, for example, other suitable attaching means may be provided and this feature of the bracket may, therefore, be varied to suit the particular case. It will also be seen that the top of the bracket 159, adjacent the bend 163, is slightly below the level of the table top so that the flexible element 150, when bent down by the weight of the material being cut, will lie smoothly against the top of the table 19. In Fig. 8 the member 150 has been shown in the position which it will naturally take, due to its own resiliency, that is, sprung away from the top of the table, whereas Figs. 6 and 7 show the same resilient member 150 in its depressed position, where it is held by the weight of the workpiece 158, or the pressure of the saw guide, or by the hand of the operator.

The reason for making the element 150 flexible and preferably resilient is to permit it to lie flat against the table whenever the device is in use for cutting discs. It will be noted that in all cases the securing means for holding that end of the element 150 which is remote from the saw, are arranged below the plane of the table top. If this were not so and if elements 153 and 154, for example, projected above the plane of the table top, it is obvious that they would interfere with an extensive workpiece lying on the top of the table and while in some cases they might merely cause annoyance and inaccuracies due to thus interfering with the workpiece, in certain other cases, where the workpiece is of highly finished or delicate material, they might produce mars, dents or scratches in said workpiece. It is thus evident that the flexibility of the element 150 serves two distinct purposes, namely, first, it prevents the workpiece from "riding" upon the securing means 153 or 154 and thus causing it to lie unevenly upon the table top, resulting in inaccurate cuts, and, second, it prevents the workpiece from being marred or scratched by such securing means 153 and 154. The element 150 is made as thin as is consistent with retaining sufficient strength and rigidity and its thickness in all cases is so slight that it does not interfere materially with the proper alinement of the workpiece on the table top. In popular language this degree of thickness is often referred to as "paper-thin", that is, the thickness is in the neighborhood of one or two one-hundredths of an inch, more or less. It is obvious that this degree of thickness is such that the element 150 may be considered relatively thin, as compared with either the thickness of the ordinary workpieces cut by the saw or the unevennesses of surface of ordinary workpieces, and the term "relatively thin" employed in the claims is to be understood as having such significance.

Of course, in cutting discs or circular arcs, etc., by means of any of the various forms of the present invention, it is necessary to provide a suitable starting point at the proper distance between the pivot and the saw blade and this may be done either by cutting a notch in the edge of a board or other workpiece at the proper distance from the pivot or by drilling a saw-receiving hole in the material, likewise at the proper distance from the said pivot. Where the material to be cut is hard, to permit the pivot 141, or any of the other pivots, for that matter, to be forced thereinto readily by a mere light pressure, a hole may be drilled partly or entirely through the said material to receive the pivot.

While this invention has been described as primarily applicable to scroll saws, it is obvious that most of the features thereof can be applied equally well to any other saws having a blade actuated rectilinearly through a suitable aperture in the table top whether such actuation be a reciprocation, as in the case of the scroll saw just described, or a continuous uniform motion in one direction, as, for example, in band saws, or the like. It is, therefore, to be understood that the invention is not to be considered to be limited to scroll saws, but that it is applicable to all saws having a blade moved rectilinearly with respect to the table.

It is also obvious that while we have shown the table 19 only at a position at right angles to the saw blade 44, yet the operation of the disc-cutting means is not restricted to cutting discs having the edge perpendicular to the face, but by tilting the table it is possible to provide a "circular bevel" or frusto-conical edge on the discs, and it is possible, of course, to cut corresponding bevels on both sides of the disc by merely reversing it upon the pivot after completing the first cut and it is also possible to cut a disc having a cylindrical central peripheral portion with a beveled or frusto-conical portion on each side thereof by first cutting the disc with the table perpendicular to the saw and then repeating the cuts with suitable inclinations of the table.

Having described a preferred embodiment of the invention and various modifications thereof, it will be understood that many changes, additions, omissions, etc., can be made therein without departing from the inventive idea, and, therefore, it is not to be considered as limited to the specific embodiments illustrated, but only as specified in the following claims.

We claim:

1. A saw having a table, a saw blade, means for actuating said saw blade rectilinearly through the table, there being a suitable aperture in the table for the passage of said blade, a relatively thin flexible plate, extending above, and bendable into contact with, the top of the table, a pivot member secured to said plate, said plate being adjustable to vary the distance between the pivot member and the saw blade, and means shaped and located so as not to interfere with a workpiece resting on the table, for securing the plate at any such adjusted position with respect to the table whereby the pivot member may be maintained at a desired distance from the saw blade.

2. A saw having a table, a saw blade, means for actuating said saw blade rectilinearly through the table, there being a suitable aperture in the table for the passage of said blade, a flexible plate extending over the top of the table, a pivot member secured to said plate, and means for securing the plate at any desired adjusted position with respect to the table whereby the pivot member may be adjusted to a desired distance from the saw blade, the securing means being disposed entirely below the plane of the top of the table, so as not to interfere with a workpiece resting on said table.

3. A saw having a table, a saw blade, means for actuating said saw blade rectilinearly through the table, there being a suitable aperture in the table for the passage of said blade, a slotted flexible plate, extending over the top of the table, a pivot member secured to said plate, and means passing through the slot for securing the plate at any desired adjusted position with respect to the table whereby the pivot member may be adjusted to a desired distance from the saw blade, the securing means being disposed entirely below the plane of the top of the table, so as not to interfere with a workpiece resting on said table.

4. A saw comprising a table, said table having a portion at one side inclined at a slight angle to the plane of the table proper, a saw blade, means for actuating said saw blade rectilinearly through the table, there being a suitable aperture in the table for the passage of said blade, a slotted flexible plate, a pivot member secured to said plate, and means passing through the slot of the plate and fastened to the inclined portion of the table, for securing the plate at any desired adjusted position over the table, whereby the pivot member may be adjusted to a desired distance from the saw blade, the securing means being disposed entirely below the plane of the top of the table, so as not to interfere with a workpiece resting on said table.

5. An attachment for use in connection with a saw table and saw, for cutting discs by means of said saw, said attachment comprising a bracket, means for detachably securing the bracket to the saw table, a slotted, flexible plate, a pivot member secured to said plate and means passing through the slot of the plate and secured to the bracket, for holding the plate in any desired adjusted position over the table whereby the pivot member may be adjusted to a desired distance from the saw, the holding means being disposed entirely below the plane of the top of the table, so as not to interfere with a workpiece resting on said table and on said flexible plate, when a portion of said plate is depressed into contact with the table top by said workpiece.

6. An attachment for use in connection with a saw table and saw, for cutting discs by means of said saw, said attachment comprising a bracket, said bracket having a table-engaging portion at one end, to cooperate with the saw table, a screw, threaded through the said portion, for detachably securing the bracket to the saw table, a slotted, flexible plate, a pivot member secured to said plate and means passing through the slot of the plate and secured to the bracket, for holding the plate in any desired adjusted position over the table, whereby the pivot member may be adjusted to a desired distance from the saw, the holding means being disposed entirely below the plane of the top of the table, so as not to interfere with a workpiece resting on said table and on said flexible plate, when a portion of said plate is depressed into contact with the table top by said workpiece.

7. An attachment for use in connection with a flanged saw table and saw, for cutting discs by means of said saw, said attachment comprising a bracket, said bracket having a substantially U-shaped portion at one end, to cooperate with the flange on the saw table, a screw, threaded through one of the arms of the said U-shaped portion, for detachably securing the bracket to the said flange, a slotted, flexible plate, a pivot member secured to said plate and means passing through the slot of the plate and secured to the bracket, for holding the plate in any desired adjusted position over the table whereby the pivot member may be adjusted to a desired distance from the saw, the holding means being disposed entirely below the plane of the top of the table, so as not to interfere with a workpiece resting on said table and on said flexible plate, when a portion of said plate is depressed into contact with the table top by said workpiece.

8. An attachment for use in connection with a saw table and saw, for cutting discs by means of said saw, said attachment comprising a bracket, said bracket having a table-engaging portion at one end, to cooperate with the saw table, said portion being properly dimensioned to automatically locate the bracket correctly with respect to the table, a screw, threaded through the said portion, for detachably securing the bracket to the saw table, a slotted, flexible plate, a pivot member secured to said plate and means passing through the slot of the plate and secured to the bracket, for holding the plate in any desired adjusted position over the table whereby the pivot member may be adjusted to a desired distance from the saw, the holding means being disposed entirely below the plane of the top of the table, so as not to interfere with a workpiece resting on said table and on said flexible plate, when a portion of said plate is depressed into contact with the table top by said workpiece.

9. An attachment for use in connection with a flanged saw table and saw, for cutting discs by means of said saw, said attachment comprising a bracket, said bracket having a substantially U-shaped portion at one end, to cooperate with the flange on the saw table, said portion being of proper depth to locate the bracket correctly with respect to the table when the flange is seated therein to its full depth, a screw, threaded through one of the arms of the said U-shaped portion, for detachably securing the bracket to the said flange, a slotted, flexible plate, a pivot member secured to said plate and means passing through the slot of the plate and secured to the bracket, for holding the plate in any desired adjusted position over the table whereby the pivot member may be adjusted to a desired distance from the saw, the holding means being disposed entirely below the plane of the top of the table, so as not to interfere with a workpiece resting on said table and on said flexible plate, when a portion of said plate is depressed into contact with the table top by said workpiece.

10. An attachment for use in connection with a saw table and saw, for cutting discs by means of said saw, said attachment comprising a bracket, said bracket having a table-engaging portion at one end, to cooperate with the saw table, said portion being properly dimensioned to automatically locate the bracket correctly with respect to the table, a screw, threaded through the said portion, for detachably securing the bracket to the saw table, a slotted, flexible plate, a pivot member secured to said plate and separate, spaced means passing through the slot of the plate and secured to the bracket, for holding the plate in any desired adjusted position over the table and preventing lateral shifting thereof, whereby the pivot member may be adjusted to a desired distance from the saw, the holding means being disposed entirely below the plane of the top of the table, so as not to interfere with a workpiece resting on said table and on said flexible plate, when a portion of said plate is depressed into contact with the table top by said workpiece.

11. An attachment for use in connection with a flanged saw table and saw, for cutting discs by means of said saw, said attachment comprising a bracket, said bracket having a substantially U-shaped portion at one end, to cooperate with the flange on the saw table, said portion being of proper depth to locate the bracket correctly with respect to the table when the flange is seated therein to its full depth, a screw, threaded through one of the arms of the said U-shaped portion, for detachably securing the bracket to the said flange, a slotted, flexible plate, a pivot member secured to said plate and separate, spaced screws passing through the slot of the plate and secured to the bracket, for holding the plate secure against rotation and lateral shifting in any desired adjusted position over the table, whereby the pivot member may be adjusted to a desired distance from the saw, the holding means being disposed entirely below the plane of the top of the table, so as not to interfere with a workpiece resting on said table and on said flexible plate, when a portion of said plate is depressed into contact with the table top by said workpiece.

12. An attachment for use in connection with a flanged saw table and saw, for cutting discs by means of said saw, said attachment comprising a bracket having a straight portion, a second portion bent at an acute angle to said straight portion, and a further portion bent twice at substantially right angles to said second portion, thereby forming a substantially U-shaped member, a screw, threaded through a portion of said U-shaped member, the substantially straight portion of the bracket having releasable securing means attached thereto, and a flexible slotted blade located over the top of the table and having a pivot at one end thereof, the said securing means passing through the slot and adjustably securing the blade to the said bracket, the holding means being disposed entirely below the plane of the top of the table, so as not to interfere with a workpiece resting on said table and on said flexible blade, when a portion of said blade is depressed into contact with the table top by said workpiece.

JAMES TATE.
HERBERT E. TAUTZ.